US010069267B2

(12) United States Patent
 Dinh

(10) Patent No.: US 10,069,267 B2
(45) Date of Patent: Sep. 4, 2018

(54) METHOD FOR INSTALLING A CONDUIT IN A LIQUID-TIGHT FITTING

(71) Applicant: Thomas & Betts International, LLC, Wilmington, DE (US)

(72) Inventor: Cong Thanh Dinh, Collierville, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 533 days.

(21) Appl. No.: 14/620,541

(22) Filed: Feb. 12, 2015

(65) Prior Publication Data

US 2015/0162718 A1    Jun. 11, 2015

Related U.S. Application Data

(62) Division of application No. 13/645,740, filed on Oct. 5, 2012, now Pat. No. 8,979,557.

(60) Provisional application No. 61/557,942, filed on Nov. 10, 2011.

(51) Int. Cl.
 *H01R 43/20* (2006.01)
 *H02G 3/06* (2006.01)
 *H01R 4/64* (2006.01)

(52) U.S. Cl.
 CPC .......... *H01R 43/20* (2013.01); *H02G 3/0691* (2013.01); *H01R 4/643* (2013.01); *Y10T 29/49174* (2015.01); *Y10T 29/49963* (2015.01)

(58) Field of Classification Search
 CPC .......... H01R 4/66; H01R 4/643; H01R 43/20; H02G 3/0691; Y10T 29/49174; Y10T 29/49963
 See application file for complete search history.

(56) References Cited

U.S. PATENT DOCUMENTS

| 2,423,627 | A |   | 7/1947 | Tinnerman |
| 3,452,318 | A |   | 6/1969 | Tanges, Jr. |
| 3,747,960 | A | * | 7/1973 | Bawa ................. F16L 19/0212 285/332.2 |

(Continued)

FOREIGN PATENT DOCUMENTS

| CA | 2001450 A1 | 7/1990 |
| CA | 2201137 A1 | 4/1996 |

*Primary Examiner* — Peter DungBa Vo
*Assistant Examiner* — Jeffrey Carley
(74) *Attorney, Agent, or Firm* — Taft Stettinius & Hollister LLP

(57) ABSTRACT

A method for installing a conduit in a liquid-tight fitting includes inserting a coated gland nut configured for insertion onto a conduit, wherein the gland nut includes an outer surface and internal threads. A grounding ring is placed onto external threads of a tubular fitting body having a coated intermediate portion, such that an inner surface of the grounding ring is conductively coupled to the external threads of the fitting body. The outer surface of the grounding ring includes a ground wire engaging portion projecting therefrom. The internal threads of the gland nut are loosely coupled to the external threads of the fitting body. The grounding ring is rotated to a desired position relative to the fitting body. The gland nut is tightened to the fitting body, such that the coated outer surface of the gland nut and the coated intermediate portion of the fitting body compressingly engage the grounding ring therebetween.

14 Claims, 7 Drawing Sheets

(56) References Cited

U.S. PATENT DOCUMENTS

| | | | |
|---|---|---|---|
| 4,022,966 A * | 5/1977 | Gajajiva | H01R 4/646 |
| | | | 174/653 |
| 4,445,733 A | 5/1984 | Deel | |
| 4,696,908 A | 9/1987 | Gutter et al. | |
| 4,875,864 A | 10/1989 | Campbell | |
| 5,620,290 A | 4/1997 | Homfeldt et al. | |
| 5,828,008 A | 10/1998 | Lockwood et al. | |
| 5,929,383 A * | 7/1999 | Marik | H01R 13/648 |
| | | | 174/78 |
| 6,129,492 A | 10/2000 | Uno | |
| 6,202,300 B1 * | 3/2001 | Yuzwalk | H01R 4/643 |
| | | | 29/857 |
| 6,380,483 B1 | 4/2002 | Blake | |
| 6,600,632 B1 | 7/2003 | Prochazka et al. | |
| 6,665,140 B1 | 12/2003 | Prochazka et al. | |
| 6,939,097 B2 | 9/2005 | Carr et al. | |
| 7,165,980 B2 | 1/2007 | Pyron et al. | |
| 7,306,476 B2 | 12/2007 | Gerlich et al. | |
| 7,462,043 B2 | 12/2008 | Deisenhofer | |

* cited by examiner

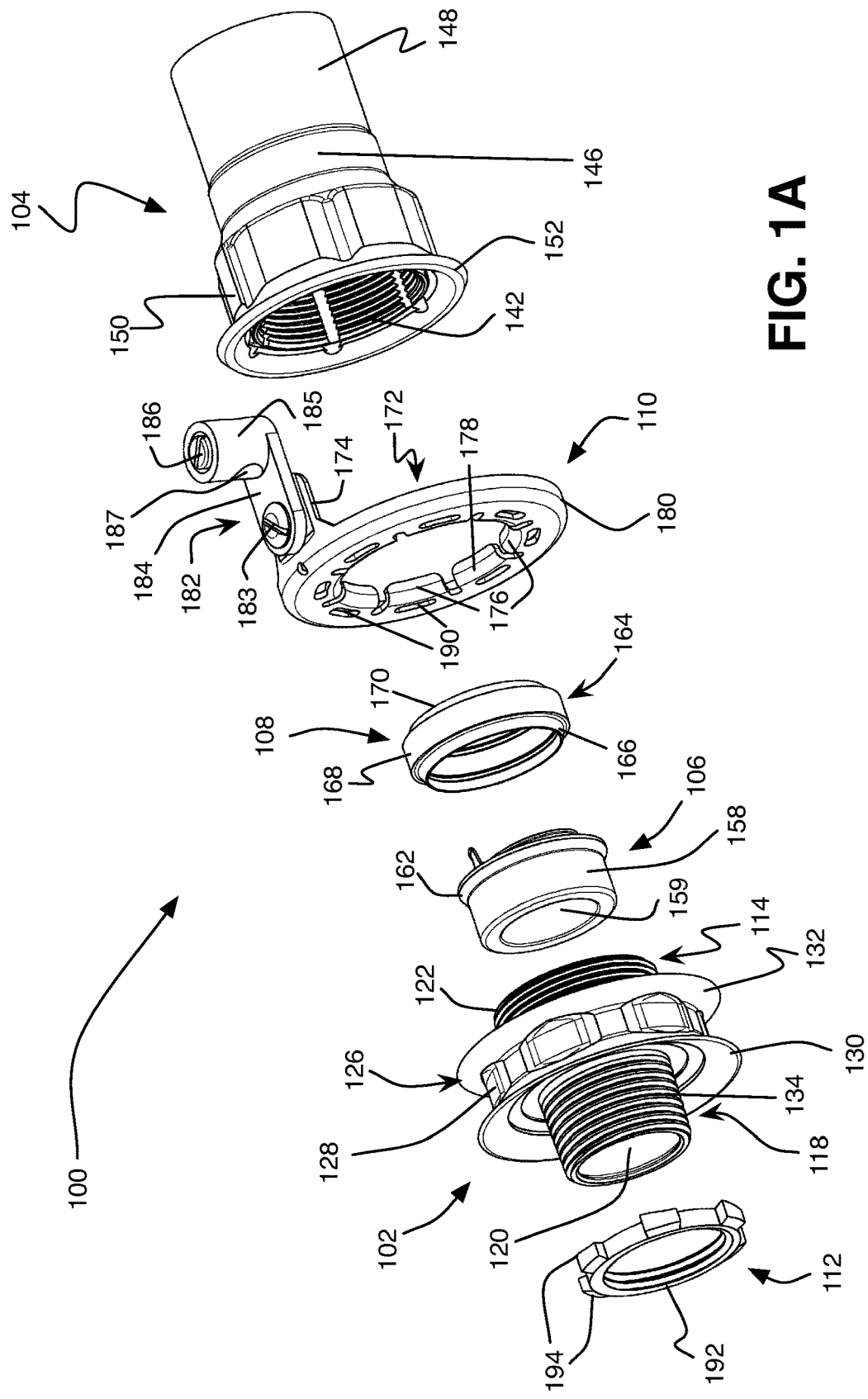

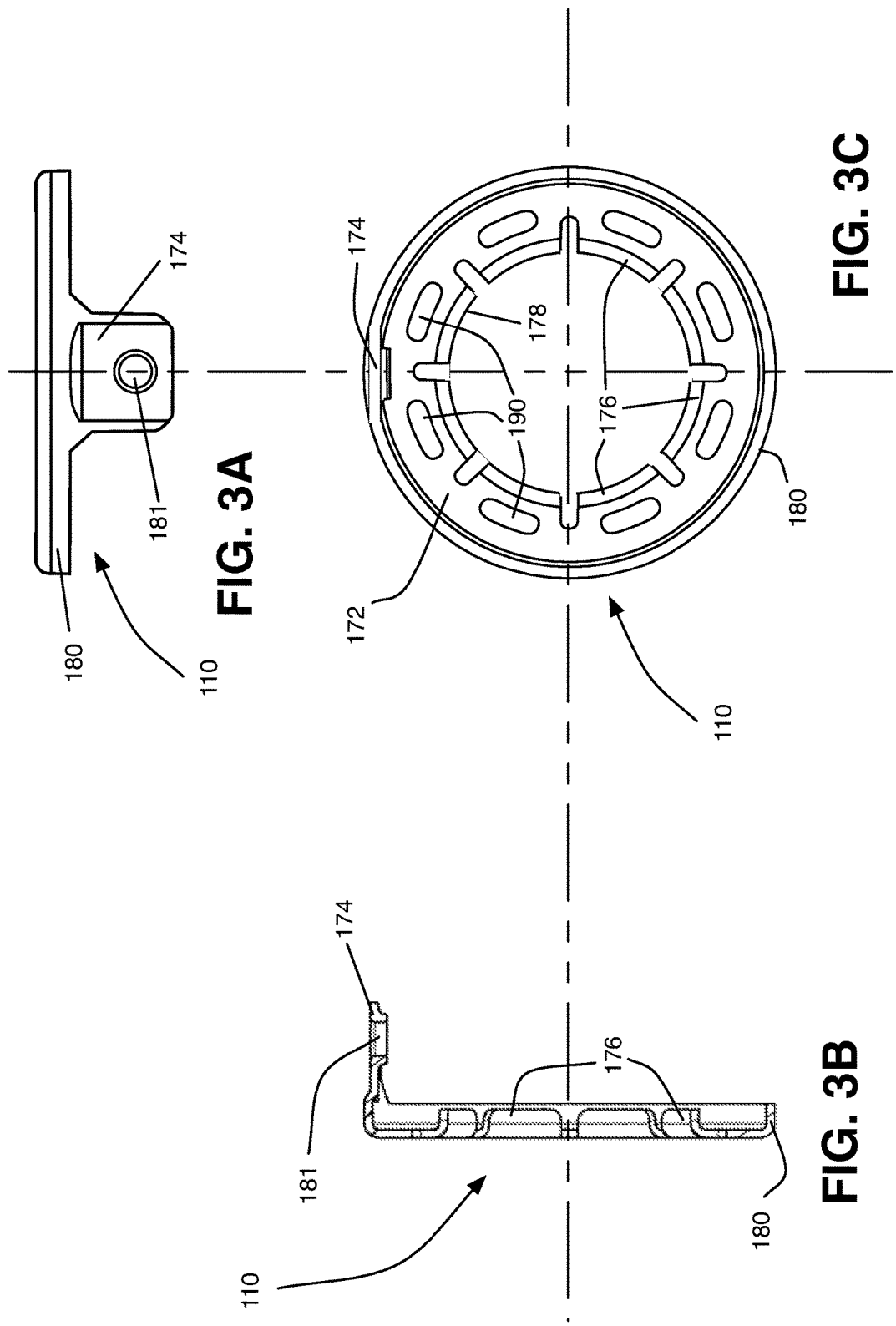

METHOD FOR INSTALLING A CONDUIT IN A LIQUID-TIGHT FITTING

CROSS-REFERENCE TO RELATED APPLICATION

This application is a divisional of and claims priority to U.S. application Ser. No. 13/645,740 filed on Oct. 5, 2012, which is a non-provisional of U.S. Provisional Application No. 61/557,942 filed on Nov. 10, 2011, the disclosures of which are hereby incorporated herein by reference.

BACKGROUND OF THE INVENTION

Conduits, such as flexible conduits, are used in a wide range of applications, such providing a protective pathway for carrying electrical or communication cables. Conduit fittings, such as liquid-tight fittings, are designed to terminate conduits in a manner that protect the conduits and terminations from various environmental conditions, such as wet or corrosive environments. For example, liquid-tight conduit fittings may be used in wastewater treatment applications, saltwater applications, petrochemical refining applications, and food processing applications.

BRIEF DESCRIPTION OF THE DRAWINGS

FIGS. 1A and 1B are exploded isometric and exploded cross-sectional views, respectively, of an exemplary embodiment of a liquid-tight conduit fitting;

FIGS. 3A-3C are top, cross-sectional, and end views of the grounding element of FIG. 1A.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

One or more embodiments disclosed herein relate to improved fittings for terminating flexible conduits, such as conduits for carrying electrical cables, communication cables, or other wiring. More specifically, the described conduit fitting may include a fitting body coated or covered in a resilient, liquid-proof material, such as a polyvinyl chloride (PVC) coating. The fitting also includes a mating gland nut configured to compressingly secure a sealing ring provided within the fitting. The gland nut may also be coated by the resilient, liquid-proof material.

Consistent with implementations described herein, a grounding ring may be rotatably inserted between the gland nut and the fitting body so as to conductively contact the gland nut or the fitting body and provide a ground path outside of the coated fitting. During assembly of the fitting, the coating on the fitting body engages one side of the grounding ring and the coating on the gland nut engages the opposing side of the grounding ring during assembly. The grounding ring may include a ground wire engaging portion that extends from the fitting for securely coupling with one or more ground wires. An inside surface of the grounding ring may engage a conductive portion of the fitting body, to provide a ground path through the fitting. Prior to final assembly, e.g., tightening of gland nut relative to fitting body, the grounding ring may be freely rotated to a desired orientation. In this manner securing of the ground wire may be made significantly easier to perform in real world environments.

Fully tightening the gland nut relative to the fitting body causes the coating on the gland nut and the coating on the fitting body to compressingly engage the grounding ring therebetween, thereby preventing the rotation of the grounding ring relative to the fitting body and providing a liquid-tight seal that effectively envelopes the entire fitting.

Figure 1B:
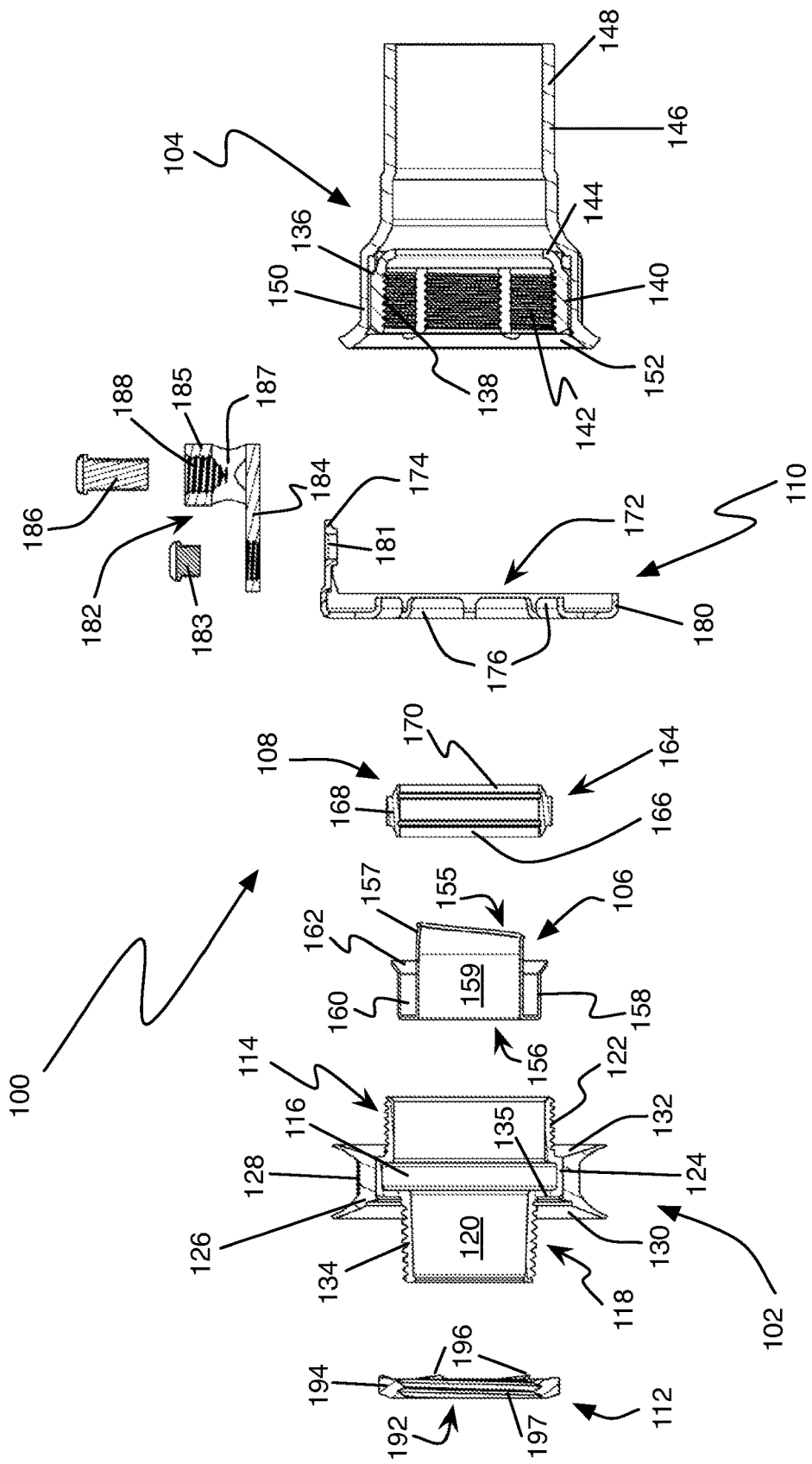
Figure 1C:
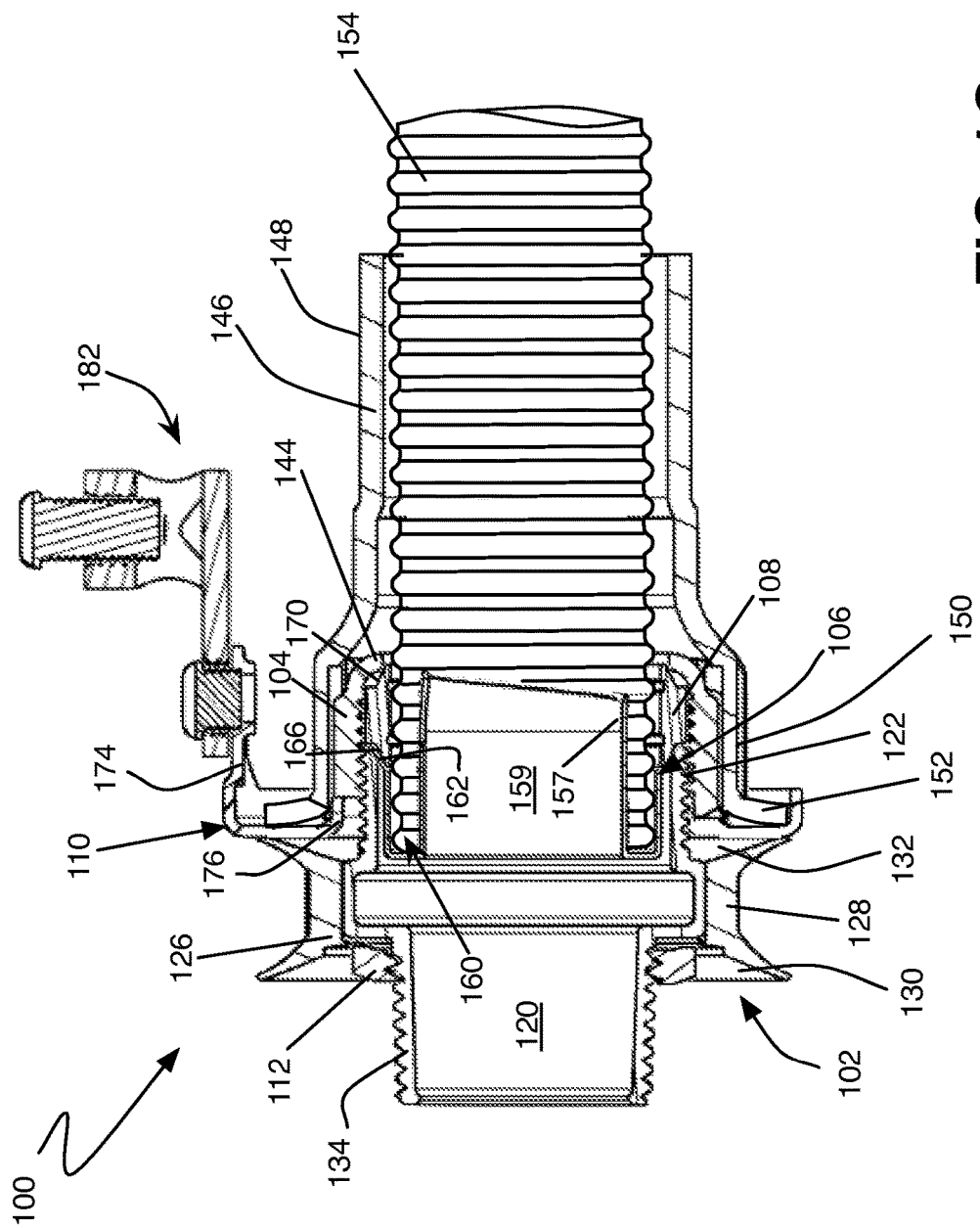
FIG. 1C is a cross-sectional view of the fitting of FIG. 1A in an assembled configuration.
Figure 2A:
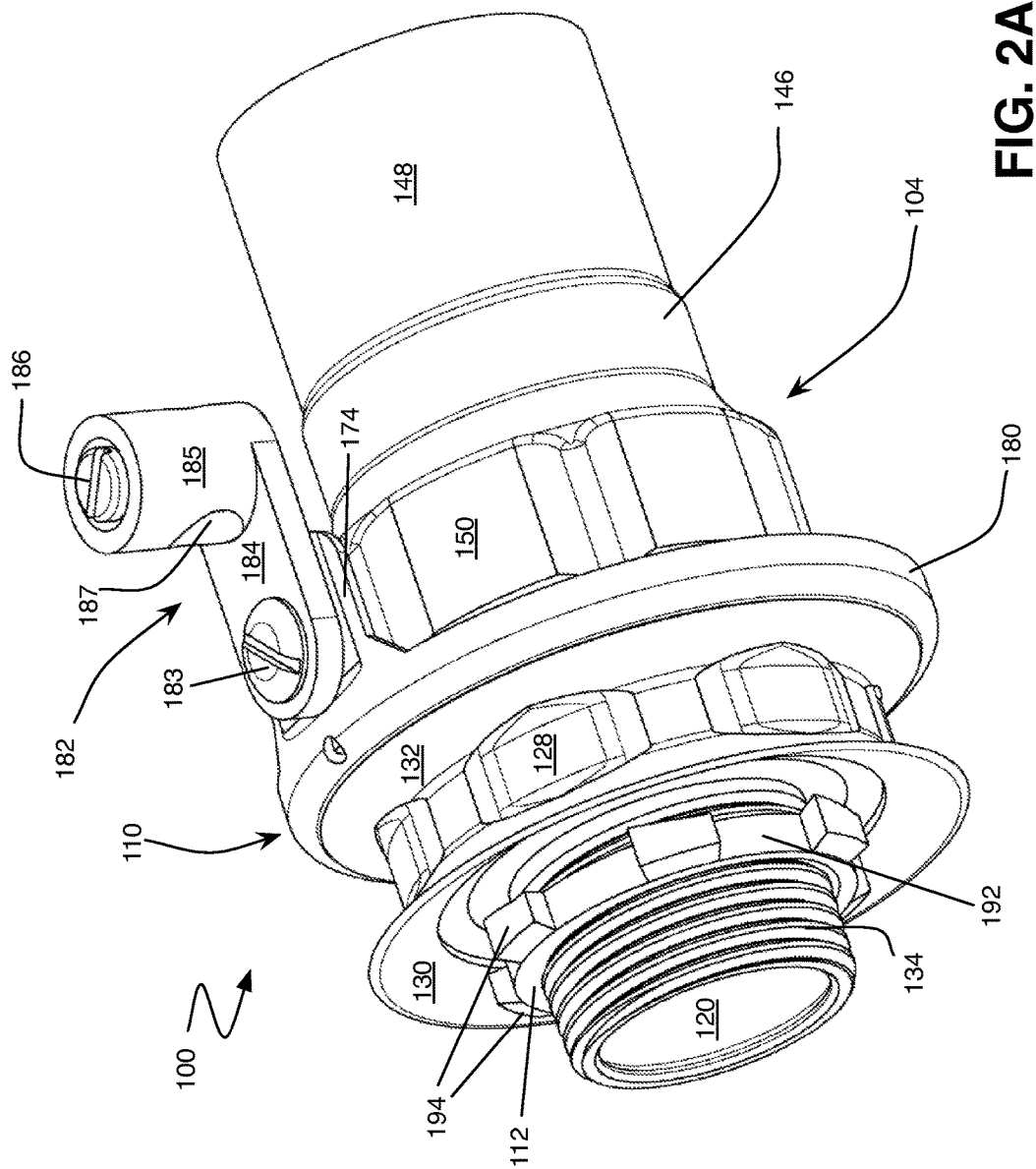
FIG. 2A is a front isometric view of the fitting of FIG. 1A in an assembled configuration.
Figure 2B:
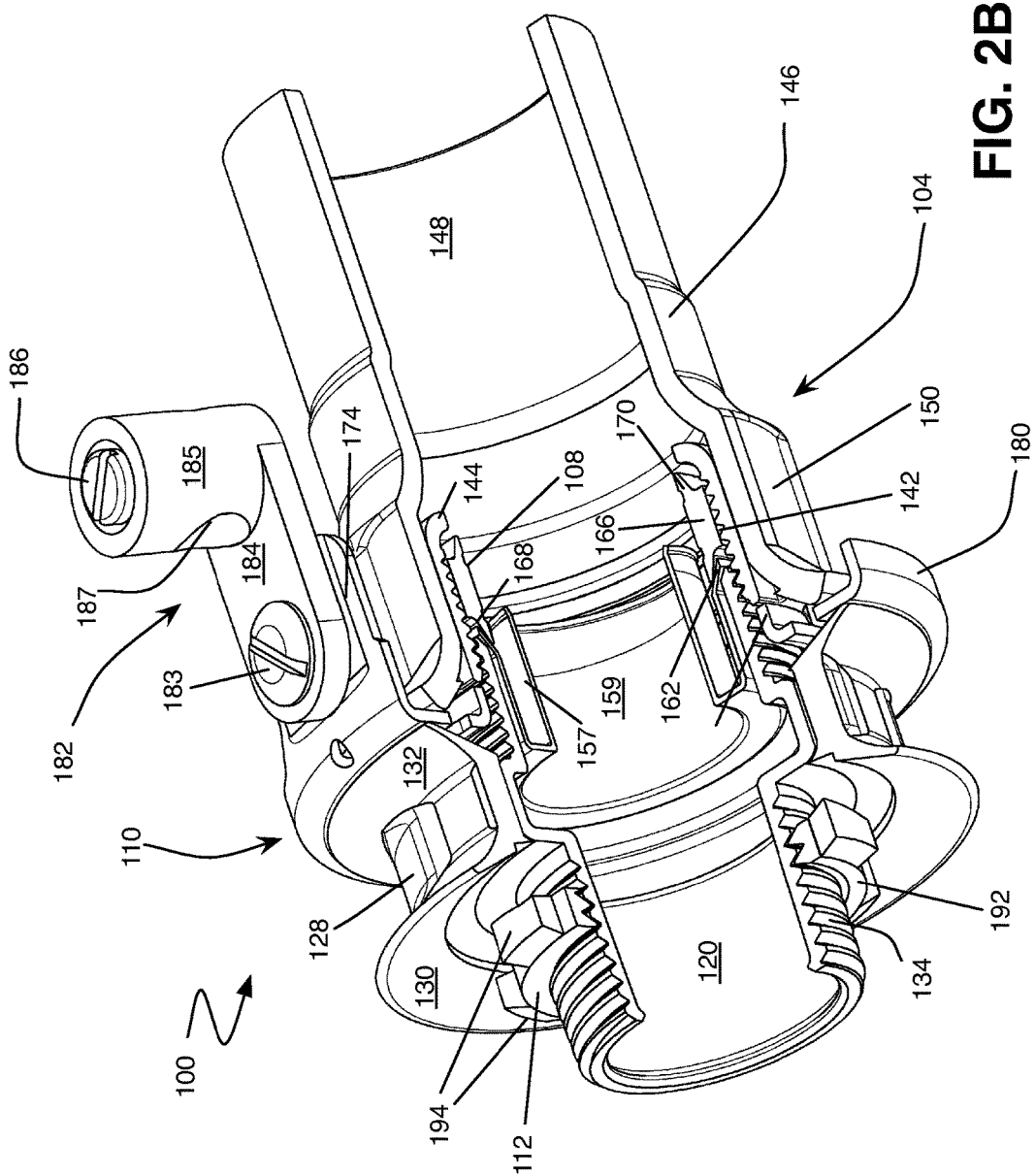
FIG. 2B is a cut-away isometric view of the fitting of FIG. 2A.

FIGS. 1A and 1B are exploded isometric and exploded cross-sectional views, respectively, of an exemplary embodiment of a liquid-tight conduit fitting 100 consistent with implementations described herein. FIG. 1C is a cross-sectional diagram of fitting 100, in an assembled and installed configuration. FIGS. 2A and 2B are isometric and cut-away isometric views, respectively, of the assembled fitting 100 of FIG. 1C.

As illustrated in FIGS. 1A and 1B, fitting 100 may include a fitting body 102, a gland nut 104, a conduit terminating component 106, a compression bushing 108, a grounding ring 110, and a locknut 112. In the following description, the relative terms "rearward" and "forward" are used to designate various portions or components of fitting 100 in reference to a direction of insertion of a conduit therein. These terms are descriptive only and that in some implementations, the terms may be reversed, such as in reference to a removal of the conduit from fitting 100.

In one implementation, fitting body 102 may include an elongate hollow, generally tubular member having a rearward conduit-receiving end 114, an intermediate portion 116, and a forward enclosure-side end 118. Fitting body 102 may include an internal central bore 120 extending along a central longitudinal axis between conduit-receiving end 114 and enclosure-side end 118. As shown, conduit-receiving end 114 may include external threads 122 formed thereon for attaching to gland nut 104 in the manner described below. In some implementations, fitting body 102 may be formed of a metal, such as aluminum, steel, or brass.

Referring to FIG. 1B, intermediate portion 116 may include a tool-engaging outer surface 124 for use in securing fitting body 102 to a terminating box or enclosure (not shown). Additionally, intermediate portion 116 may be covered with a liquid-proof coating 126, such as PVC coating or other polymer or elastomer. In some embodiments, liquid-proof coating 126 may be selected to be corrosion-resistant. As shown, liquid-proof coating 126 may include a tool-engaging portion 128 that corresponds to or overlays tool-engaging outer surface 124 of fitting body 102. Application of a torque-applying tool (e.g., a wrench) to tool-engaging portion 128 may cause application of the torque to tool-engaging outer surface 124.

Liquid-proof coating 126 may further include forward and rearward facing resilient rims 130 and 132, respectively. That is, liquid-proof coating 126 may be formed of a semi-rigid resilient material, that projects outwardly away from fitting body 102 to form rims 130 and 132. As described below, resilient rims 130/132 may deformably engage additional components in fitting 100 (e.g., grounding ring 110, a portion of gland nut 104, etc.) and/or the terminating enclosure to seal fitting 100 from the environment in a liquid-tight manner. In one implementation, resilient rims 130/132 may project away from intermediate portion 116 in an angled manner, such than an outer periphery of resilient rims 130/132 contacts its respective corresponding component in fitting 100 before an inner portion of resilient rims 130/132. Such a configuration allows for progressively increased sealing function as the fitting is installed.

Forward enclosure-side end 118 may include external threads 134 formed thereon to facilitate attachment of fitting 100 to a wall of an electrical box or other enclosure (not shown). As shown, forward enclosure-side end 118 may include an outside diameter smaller than an outside diameter of tool-engaging outer surface 124, so as to form a shoulder portion 135 therewith. As described below, shoulder portion 135 may grippingly engage locknut 112 during installation of fitting 100 to the external enclosure or electrical box.

Gland nut 104 may include a generally annular configuration having an outer surface 136 and an inner surface 138. Outer surface 136 may include a hexagonal tool-engaging portion 140 on at least a portion thereof for engaging a torque-applying tool, such as a wrench. Inner surface 138 may include internal threads 142 formed thereon for engaging and mating with corresponding external threads 122 on rearward conduit-receiving end 114 of fitting body 102. In some implementations, gland nut 104 may be formed of a metal, such as aluminum, steel, or brass.

As shown in FIG. 1B, a rearward end of gland nut 104 may include an inwardly projecting rim 144. As described below, rim 144 may engage a corresponding surface of compression bushing 108 during assembly of fitting 100.

As further shown in FIGS. 1A and 1B, gland nut 104 may include a liquid-proof coating 146, such as PVC coating or other polymer or elastomer. Liquid-proof coating 146 may include a rearward conduit sealing portion 148, an intermediate tool-engaging portion 150, and a forward resilient rim 152.

As shown in FIG. 1C, conduit sealing portion 148 may sealingly engage an outer surface of an installed conduit 154. For example, conduit sealing portion 148 may have an inside diameter slightly smaller than an outside diameter of conduit 154. During assembly/installation, conduit sealing portion 148 may stretch or deform over conduit 154 to affect a sealed relationship that prevents moisture or other contaminants from entering fitting 100.

Intermediate tool-engaging portion 150 may overlay or conform to tool-engaging portion 140 of gland nut 104. More specifically, application of a torque-applying tool to tool-engaging portion 150 may cause application of the torque to tool-engaging outer portion 140.

Forward resilient rim 152 may deformably engage one or more additional components in fitting 100 (e.g., grounding ring 110, a portion of fitting body 102, etc.) to cooperatively seal fitting 100 from the operating environment in a liquid-tight manner. As shown in FIG. 1B, similar to resilient rims 130/132, resilient rim 152 may project away from intermediate portion 150 of liquid-proof coating 146 in an angled manner, such than an outer periphery of resilient rim 152 contacts its respective corresponding component in fitting 100 before an inner portion of resilient rim 152.

Referring to FIGS. 1A and 1B, conduit terminating component 106 may include an elongate, hollow, generally tubular member having a rearward conduit-receiving end 155 and a forward terminating end 156. Conduit terminating component 106 may include a tubular inner portion 157 having a central bore 159 extending therethrough and an outer ferrule portion 158. As shown, ferrule portion 158 may annularly extend from forward terminating end 156 to form a cup-like cavity 160 for receiving a forward end of conduit 154, as shown in FIG. 1B.

In one implementation, an outer diameter of ferrule portion 158 is sized substantially similar to an inside diameter of conduit receiving-end 114 in fitting body 102, such that ferrule portion 158 is received within conduit receiving-end 114 during assembly of fitting 100. As shown in FIGS. 1A and 1C, ferrule 158 may include a flared rearward edge 162 configured to engage a terminating end of conduit receiving-end 114 and simultaneously engage a forward edge of compression bushing 108, as described below.

As shown, the outer surface of ferrule portion 158 may be annularly spaced from an outer surface of tubular inner portion 157 to form cup-like cavity 160. For example, the spacing may be substantially similar to a maximum thickness of an outer wall of conduit 154, such that conduit 154 may be snugly received within cup-like cavity 160 during assembly.

In one embodiment, tubular inner portion 157 of conduit termination component 106 may include an angled configuration for engaging a generally helical outer surface of conduit 154. In this configuration, the helical out surface of conduit 154 may effective thread onto tubular inner portion 157 to seat conduit 154 within cup-like cavity 160 of ferrule portion 158.

Compression bushing 108 may include a generally annular body 164 having a forwardly tapered end 166, a cylindrical intermediate portion 168, and rearwardly tapered end 170. Compression bushing 108 may be formed of a resilient material, such as nylon or other polymeric material. Further, cylindrical intermediate 168 portion may have an annular thickness substantially equivalent to a difference between an outside diameter of conduit 154 and the inside diameter of inner surface 138 of gland nut 104. Further, as briefly described above, forwardly tapered end 166 of compression bushing 108 may be configured to engage flared rearward edge 162 of ferrule portion 158 in conduit terminating component 106 and rearwardly tapered end 170 may be configured to engage rim 144 on the rearward end of gland nut 104.

In this configuration, during axial movement of gland nut 104 toward fitting body 102 (e.g., caused via rotational engagement of threads 142 and 122), conduit-receiving end 114 of fitting body 102 may engage the forward surface of flared rearward edge 162 of ferrule portion 158. This, in turn, may cause the rearward surface of flared rearward edge 162 to engage forwardly tapered end 166 of compression bushing 108 and further cause compression bushing 108 to move axially rearward and radially inward relative to conduit 154. Further axial movement and gland nut 104 toward fitting body 102, causes rearwardly tapered end 170 of compression bushing 108 to engage rim 144 of gland nut 104. This engagement, when combined with the engagement of flared rearward edge 162 with forwardly tapered end 166, forces compression bushing 108 inwardly toward conduit 154, and further causing compression bushing to resiliently engage conduit 154, thus retaining conduit 154 securely in fitting 100.

Grounding ring 110 may include a substantially annular or ring-like body 172, a ground wire tab 174, and a number of contact tabs 176. FIGS. 3A-3C are top, cross-sectional, and end views of an exemplary grounding ring 110. As shown, annular body 172 may include an inner surface 178 and an outer surface 180. Ground wire tab 174 may project from outer surface 180 of grounding ring 110. For example, ground wire tab 174 may project rearwardly relative to annular body 172.

As shown in FIG. 1B, ground wire tab 174 may include an attachment hole 181 for securing a ground wire bracket 182 thereto, via a bolt 183, for example. Ground wire bracket 182 may include a bracket body 184, a ground wire receiving element 185, and a set screw 186. As shown in FIG. 1B, bracket body 184 may include an aperture that aligns with attachment hole 181 for receiving bolt 183 to secure ground wire bracket 184 to grounding ring 110. Ground wire receiving element 185 may project radially outwardly from bracket body 184 and may include a wire receiving hole 187 and a threaded set screw receiving aperture 188. Following assembly of fitting 100, as described below, one or more ground wires may be inserted into wire receiving hole 187, and retained in place by set screw 186.

Returning to FIG. 3B, in one implementation, contact tabs 176 may project axially rearwardly from annular body 172 in a spaced radial relationship from inner surface 178 of grounding ring 110. For example, contact tabs 176 may include portions of annular body 172 that have been bent or rolled (e.g., rearwardly relative to annular body 172, as shown in FIGS. 1A and 1B). This configuration, in addition to the ring-like configuration of grounding ring 110 increases an axial surface area of inside surface 178 to engage fitting body 102. For example, as shown in FIGS. 1C and 2B, a diameter of inside surface 178 (formed by contact tabs 176) may be sized substantially similar with the outside diameter of external threads 122 of fitting body 102, such that grounding ring 110 may be placed in an electrically coupled contact with fitting body 102 during assembly, e.g., by placing grounding ring 110 around threads 122 prior to engagement of threads 122 with threads 3 on ground nut 104.

Returning to FIG. 3C, in one embodiment annular body 172 may include a number of annular slots 190 formed radially about annular body 172 in a spaced relationship. As described below, slots 190 may serve a dual purpose of preventing deformation of outside surface 180 of grounding ring 110 resulting from possible deformation of inside surface 178 occurring during tightening of fitting. In addition, slots 190 provide apertures through which forward resilient rim 152 on liquid-proof coating 146 of gland nut 104 may sealing engage rearward resilient rim 132 on liquid-proof coating 126 of fitting body 102. That is, slots 189 may provide openings that resilient rims 152/132 may squeeze through, thereby increasing the sealing efficacy of fitting 100. Consistent with embodiments described herein, grounding ring 110 may be formed of a conductive material, such as a metal like brass, aluminum or steel.

Locknut 112 may include a substantially annular body 192 having a number of projections 194 extending radially outwardly therefrom. As shown in FIG. 1B, end portions of projections 194 may form barbs or gripping elements 196 that engage shoulder portion 135 during installation of fitting 100 on an electrical box or other enclosure (not shown). In some implementations, as shown in FIG. 1B, body 192 of locknut 112 may include internal threads 197 to mating engage external threads 134 on fitting body 102 during assembly and/or installation of fitting 100. In some implementations, locknut 112 may be made from a metal (e.g., steel, etc.).

As shown in FIGS. 1C, 2A, and 2B, in addition to forcibly causing compression of compression bushing 108, as described above, axial movement of gland nut 104 relative to fitting body 102 further causes resilient rims 132 and 152 to engage annular body 172 of grounding ring 110, thereby securing grounding ring 110 relative to fitting body 102 and gland nut 104. As described above, the ring-like nature of grounding ring 110 enables rotational movement of grounding ring 110 relative to fitting body 102/gland nut 104 prior to tightening of fitting 100. In this manner, grounding ring 110 may be rotated so that tab ground wire tab 174 is positioned in a desired location for connecting the ground wire(s) thereto. Once positioned, gland nut 104 may be tightened relative to fitting body 104, thereby causing the aforementioned compression of compression bushing 108 and the compression of resilient rims 152/132 to secure grounding ring 110 in a fixed position and to provide a liquid-tight seal for fitting 100.

Figure 4:
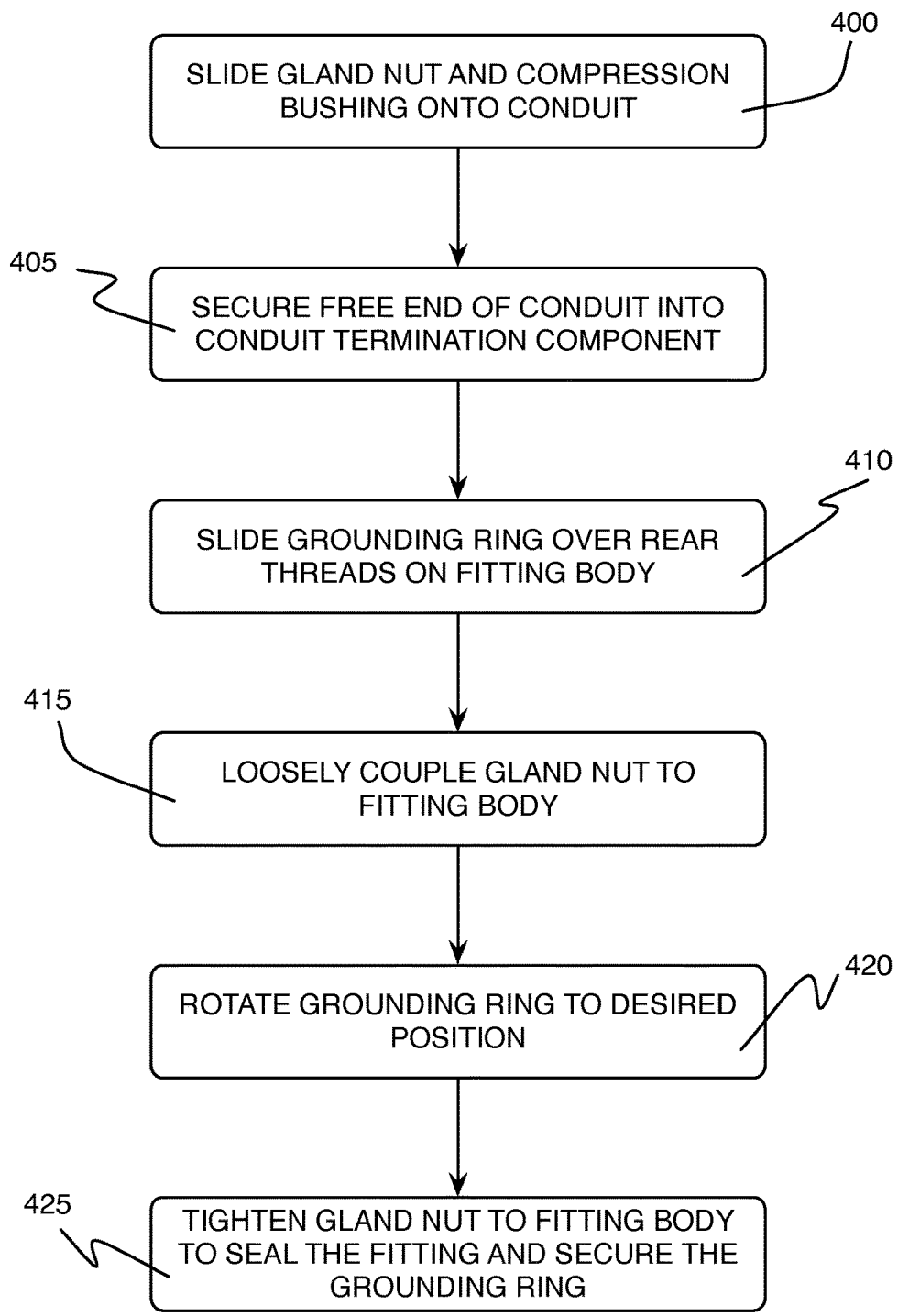
FIG. 4 is a flow diagram of an exemplary method for assembling/installing the liquid-tight fitting of FIG. 1A.

FIG. 4 is a flow diagram of an exemplary method for assembling/installing liquid-tight fitting 100 in a manner consistent with embodiments described herein. Initially, gland nut 104 and compression bushing 108 may be slid onto the free end of conduit 154 (block 400). Next, the free end of conduit 154 may be seated or secured within ferrule portion 158 of conduit terminating component 106 (block 405). For example, the helical outer surface of conduit 154 may be "threaded" onto tubular inner portion 157 and received into cup-like cavity 160.

Next, grounding ring 110 may be slid over threads 122 of fitting body 102 (block 410). As described above, this causes contact tabs 176 to conductively engage fitting body 102. Gland nut 104 may then be loosely coupled to fitting body 102 (block 415). For example, internal threads 142 on gland nut 104 may be engaged with (e.g., by hand tightening) external threads 122 on fitting body 102. Grounding ring 110 may be positioned in a desired location relative to fitting body 102 (block 420). For example, grounding ring 110 may be rotated about fitting body 102, until ground wire tab 174 is in a desired position relative to fitting body 102. Such desired location may include a location having unfettered access to ground wire(s), tools, etc.

Gland nut 104 may then be securely tightened relative to fitting body 102 (block 425). As described above, such tightening may cause compression bushing 108 to become compressed to conduit 154 and may further cause resilient rims 132 on liquid-proof coating 126 of fitting body 102 and resilient rim 152 on liquid-proof coating 146 of gland nut 104 to sealingly engage grounding ring 110, thereby securing grounding ring 110 from undesired rotational movement and sealing fitting 100 from environmental conditions.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to conduits for carrying electrical cables and fittings for such cables. In other embodiments, features described herein may be implemented in relation to other types of cables or conduits.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for installing a conduit in a liquid-tight fitting, comprising:
    placing a coated gland nut on the conduit, the gland nut having an outer surface and internal threads;
    placing a grounding ring onto, and in directed contact with, external threads of a tubular fitting body having a coated intermediate portion, such that an inner surface of the grounding ring is directly conductively contacting the external threads of the fitting body,
    wherein an outer surface of the grounding ring includes a ground wire engaging portion projecting therefrom;
    loosely coupling the internal threads of the gland nut to the external threads of the fitting body;
    rotating the grounding ring to a desired position relative to the fitting body; and
    tightening the gland nut to the fitting body, such that the coated outer surface of the gland nut and the coated intermediate portion of the fitting body compressingly engage the grounding ring therebetween.

2. The method of claim 1, wherein the coated gland nut and the coated intermediate portion of the fitting body comprise corrosion-resistant coatings.

3. The method of claim 2, wherein the corrosion-resistant coatings comprise polyvinyl chloride (PVC) coatings.

4. The method of claim 1, wherein the grounding ring comprises contact tabs formed on the inner surface thereof, and wherein placing the grounding ring onto external threads of the tubular fitting body further comprising placing the contact tabs over the external threads to conductively engage the external threads of the fitting body.

5. The method of claim 4, wherein the contact tabs are formed in a spaced radial relationship relative to each other.

6. The method of claim 4, wherein the grounding ring includes an annular body and wherein the contact tabs comprise portions of the grounding ring that are bent relative to the annular body.

7. The method of claim 1, wherein the grounding ring comprises a plurality of radially spaced slots.

8. The method of claim 1, wherein the coated intermediate portion of the fitting body includes a rearwardly extending resilient rim and the coated gland nut includes a forwardly extending resilient rim,
    wherein the tightening the gland nut to the fitting body causes the rearwardly extending resilient rim and the forwardly extending resilient rim to compressingly engage the grounding ring.

9. The method of claim 8, wherein the rearwardly extending resilient rim of the fitting body and the forwardly extending resilient rim of the gland nut each include opposingly angled configurations.

10. The method of claim 1, wherein tightening the gland nut to the fitting body further comprises:
    engaging a first tool to a tool engaging portion of the coated intermediate portion of the fitting body;
    engaging a second tool to a tool engaging portion of the coated outer surface of the gland nut; and
    rotating one of the gland nut relative to the fitting body by rotating either the first tool or the second tool.

11. The method of claim 1, wherein the grounding ring further comprises a ground wire bracket secured to the ground wire engaging portion,
    wherein the ground wire bracket includes an aperture for receiving one or more grounding wires therein.

12. The method of claim 11, further comprising:
    inserting a grounding wire into the ground wire bracket; and
    securing the grounding wire to the ground wire bracket.

13. The method of claim 12, wherein the securing the grounding wire to the ground wire bracket further comprises securing the grounding wire to the ground wire bracket using a set screw.

14. The method of claim 1, further comprising, prior to loosely coupling the internal threads of the gland nut to the external threads of the fitting body:
    inserting a compression bushing onto a free end of the conduit forwardly of the gland nut;
    inserting a free end of the conduit into a conduit terminating component, wherein a rearward portion of the conduit terminating component is configured to engage a forward end of the compression bushing; and
    inserting the conduit terminating component into the tubular fitting body,
    wherein the tightening the gland nut to the fitting body causes the conduit terminating component to engage the forward end of the compression bushing, thereby causing the compression bushing to deformably engage the conduit.

* * * * *